US012036630B2

(12) United States Patent
Hutchison et al.

(10) Patent No.: US 12,036,630 B2
(45) Date of Patent: Jul. 16, 2024

(54) SYSTEMS AND METHODS FOR CONTROLLING HEAT INPUT DURING SHORT-CIRCUITING TYPE WELDING PROCESSES

(71) Applicant: Illinois Tool Works Inc., Glenview, IL (US)

(72) Inventors: Richard M. Hutchison, Iola, WI (US); Dustin Wagner, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/715,800

(22) Filed: Dec. 16, 2019

(65) Prior Publication Data

US 2020/0206836 A1 Jul. 2, 2020

Related U.S. Application Data

(60) Provisional application No. 62/785,852, filed on Dec. 28, 2018.

(51) Int. Cl.
*B23K 9/095* (2006.01)
*B23K 9/04* (2006.01)
(Continued)

(52) U.S. Cl.
CPC .............. *B23K 9/0953* (2013.01); *B23K 9/04* (2013.01); *B23K 9/0956* (2013.01); *B23K 9/125* (2013.01); *B23K 9/16* (2013.01)

(58) Field of Classification Search
CPC ...... B23K 9/0953; B23K 9/0956; B23K 9/04; B23K 9/16; B23K 9/1336
See application file for complete search history.

(56) References Cited

U.S. PATENT DOCUMENTS 10,744,584 B2 * 8/2020 Peters ................... B23K 9/0734
2003/0080101 A1 * 5/2003 Flood ................... B23K 9/1062
219/130.21
(Continued)

FOREIGN PATENT DOCUMENTS

EP 1710037 A1 * 10/2006 ............. B23K 9/092
GB 2021816 A * 12/1979 ............. B23K 9/091
(Continued)

OTHER PUBLICATIONS

Machine translation of JP2009050872A, Oct. 2023 (Year: 2023).*
Int'l Search Report and Written Opinion Appln No. PCT/US2019/067370 mailed Jul. 8, 2021.

*Primary Examiner* — Geoffrey S Evans
(74) *Attorney, Agent, or Firm* — McAndrews, Held & Malloy, Ltd.

(57) ABSTRACT

Disclosed welding-type systems include a welding-type power source to generate output power for a periodic welding process that operates in an arc mode, an open circuit mode or a short circuit mode. A wire-feeder advances an electrode wire toward a workpiece. A controller adjusts the current to below a threshold value during the arc mode to result in the open circuit mode prior to occurrence of a short circuit event based on one or more welding process parameters. In some examples, the controller determines the occurrence of the short circuit event based on the one or more welding process parameters, and adjusts the current to rise above a second threshold level to adjust a heat generated in the welding wire in response to the occurrence of the short circuit.

19 Claims, 7 Drawing Sheets

(51) Int. Cl.
*B23K 9/12* (2006.01)
*B23K 9/16* (2006.01)

(56) References Cited

U.S. PATENT DOCUMENTS

| | | | |
|---|---|---|---|
| 2009/0026188 A1* | 1/2009 | Schorghuber | B23K 9/124 |
| | | | 219/136 |
| 2012/0012559 A1* | 1/2012 | Fisher | B23K 9/0953 |
| | | | 219/73.2 |
| 2015/0034303 A1* | 2/2015 | Parsche | H05B 6/62 |
| | | | 166/248 |
| 2015/0069029 A1* | 3/2015 | Daniel | B23K 9/0953 |
| | | | 219/125.1 |
| 2015/0151375 A1* | 6/2015 | Peters | B23K 9/125 |
| | | | 219/130.21 |
| 2015/0151376 A1 | 6/2015 | Peters | |
| 2019/0070687 A1* | 3/2019 | Furuyama | B23K 9/092 |
| 2019/0084068 A1* | 3/2019 | Furuyama | B23K 9/02 |

FOREIGN PATENT DOCUMENTS

| | | | | |
|---|---|---|---|---|
| GB | 2021882 A | * | 12/1979 | B23K 9/091 |
| JP | 2009050872 A | * | 3/2009 | |

* cited by examiner

SYSTEMS AND METHODS FOR CONTROLLING HEAT INPUT DURING SHORT-CIRCUITING TYPE WELDING PROCESSES

CROSS REFERENCE TO RELATED APPLICATIONS

This application is a Non-Provisional patent application of U.S. Provisional Patent Application No. 62/785,852 entitled "Systems and Methods for Controlling Heat Input during Short-Circuiting Type Welding Processes" filed Dec. 28, 2018, which is herein incorporated by reference in its entirety.

BACKGROUND

Welding is a process that has increasingly become ubiquitous in all industries. Conventional systems and methods for short circuit welding processes, such as welding, brazing, adhesive bonding, and/or other joining operations, require substantial investments in equipment, such as processing, displays, practice workpieces, welding tool(s), sensor(s), and/or other equipment.

Conventional short circuit gas metal arc welding (GMAW), also referred to as metal inert gas (MIG) welding, is a welding process in which an electric arc forms between an electrode and pieces of metal that are to be welded. The electric arc generates heat that causes the pieces of metal to melt. Upon cooling down of the melted pieces of metal, the pieces of metal join and form a weld. Electrical and/or physical parameters can be measured and the results of these measurements may be provided to the welder and/or to a control system and control circuit as process and system feedback during the welding operation. The welder and/or the control system and the control circuit may use this feedback information to adjust the welding parameters in real time while welding thus causing in an improvement in the welding process. In this regard, the welder may benefit from systems and methods that provide control over the short circuit welding process, such that heat generated via an electric arc is controlled during a welding processes resulting in improved quality of welding and improved weld joints.

SUMMARY

The present disclosure is directed to systems and methods for regulating heat in a controlled short circuit welding processes, substantially as illustrated by and/or described in connection with at least one of the figures, and as set forth in the claims. In particular, the disclosed controlled short circuit welding systems and methods include a welding-type power source to generate output power for a periodic welding process that operates in an arc mode, an open circuit mode or a short circuit mode. A wire-feeder advances an electrode wire toward a workpiece. A controller adjusts the current to below a threshold current value during the arc mode to result in the open circuit mode prior to occurrence of a short circuit event. The changes in command voltage are based on one or more welding process parameters. The change in current regulates the heat generated in the electric arc, which causes metal workpieces to melt and join. It is advantageous to control heat input during welding processes to improve weld quality, consistency, and make efficient use of resources.

These and other advantages, aspects and novel features of the present disclosure, as well as details of an illustrated example thereof, will be more fully understood from the following description and drawings.

DRAWINGS

The figures are not necessarily to scale. Where appropriate, similar or identical reference numbers are used to refer to similar or identical components.

DETAILED DESCRIPTION

Systems and methods for a disclosed controlled short circuit welding process include a welding-type power source to generate output power for a periodic welding process that operates in an arc mode, an open circuit mode or a short circuit mode. A wire-feeder advances an electrode wire toward a workpiece. A controller adjusts the current to below a threshold current value during the arc mode to result in the open circuit mode prior to occurrence of a short circuit event. The changes in command voltage are based on one or more welding process parameters. The change in current regulates the heat generated in the electric arc, which causes metal workpieces to melt and join.

Controlled short circuit technology, as disclosed herein, employs a bi-directional wire feeder capable of advancing and retracting an electrode wire during a welding process. An advantage of such a reciprocating wire technique is the capability to regulate heat input into a weldment by controlling welding process parameters of the wire feeder (e.g., rate, speed, direction, etc.) and/or a power source (e.g., current, voltage, power, etc.). The welding process parameters can be received by a controller or other logic routine, such as in a feedback loop, to update the process throughout the various cycles of the welding process.

In some examples, heat regulation can be attained by adjusting a welding process parameter to reduce current to below a threshold value, such as to extinguish the arc completely prior to entering the short circuit. Thus, an arc mode, where an arc is present between the wire and workpiece, is followed by an open circuit mode where current is below the threshold level, followed by a short circuit mode, where the wire and workpiece have made contact thus establishing a short circuit event.

The occurrence of the open circuit condition in the open circuit mode can be achieved by commanding the current to fall below a threshold level (e.g., commanded to zero amps via a controller) during a phase of the arc. (See, e.g., FIGS. 4-6B). As the arc is extinguished, the power source enters an open circuit voltage condition, and no heat energy is imparted to the weld and/or workpiece during this time.

Although the current is limited, other welding parameters are maintained or adjusted to continue the welding process. For example, shielding gas continues to flow and the wire continues to move forward to initiate the next short circuit event. Once the short circuit event occurs, the current is commanded to increase above a second threshold level to heat the wire and workpiece via Joule heating. The short circuit clears and the next phase of the arc mode proceeds until the phase with a zero current command is reached. At this point, the cycle repeats as disclosed above.

Advantageously, decreasing the current to extinguish the arc during the arc mode reduces the total heat input during the welding process. An additional advantage to regulating the heat input is that spatter from violent short circuit clearance events is also reduced, as the wire droplet is unlikely to be rejected at the puddle in response to Lorentz "pinch" forces.

Regulation of the heat input as disclosed herein provides particular advantages for utilization of a controlled short circuit welding process in additive manufacturing. For example, the minimum thickness of a wall of deposited material during an additive manufacturing process is related to the amount of heat generated in the wire and weld by the presence of the arc. Limiting or eliminating the arc at one or more phases lowers the amount of heat to a desired level, thereby providing fine control of wall thickness of additive parts.

In some examples, an amount of heat generated in the wire and/or the workpiece can be inferred, such as at the controller based on the one or more welding process parameters. For example, the controller can calculate the heat value based on the current provided during the welding process (e.g., during the arc and short circuit modes). For instance, the rate of current provided per time can be used to infer the melt rate and/or heat value. In some examples, the current can be multiplied by a numerical constant, and estimated based on the wire melt and/or deposition rate. Further, estimates of how much wire and/or weldment has been melted can be useful in maintaining a consistent droplet size. The melt rate can inform adjustment to the wire feed speed, current application, travel speed, etc., thereby ensuring proper application of wire to the weld puddle and maintaining weld quality.

Additionally or alternatively, control of the wire feed speed and/or direction allows control of the ratio of time spent in an arc mode (i.e. an arc is present between the wire and the workpiece) to the time in the short mode (i.e. a short circuit is present between the wire and the workpiece). Since the heat generated in the arc phases is significantly greater than that generated in the short phases, the total heat input to the workpiece can be controlled by adjusting the ratio.

In another example, the welding process utilizes a technique of periodic stopping and starting of the process while continuing to move weld torch (i.e. a "stitch mode). For example, during this process, heat input to the wire and/or weld is regulated by adjusting one or more welding parameters, such as extinguishing the arc. However, rather than lowering the current below a threshold level during a phase of the arc, two or more welding process parameters can suspended for a preset period that may span multiple phases and/or sub phases, as disclosed herein.

In one example, the welding process is initiated by an operator by use of a trigger signal, and the welding sequence begins to run for a preset period (e.g., for a predetermined period of time, over a predetermined number of phases, etc.). When the preset weld period comes to an end, a stop sequence is initiated, such as adjusting the current, voltage, power, etc. Thus, one or more welding parameters of the welding process are suspended for the preset period. At the end of the suspension period, the cycle is repeated. During the cycle(s), one or more welding process parameters can be maintained, such as provision of shielding gas coverage. This ensures that during the welding process (e.g., entrance of the wire into the weld puddle, reigniting of the arc, etc.) weld quality is maintained. This processing mode can be implemented for different applications to regulate heat input, such as reduction of weld bead humping and additive manufacturing.

In some examples, one or more of the disclosed control techniques can be implemented together to regulate heat input. Additionally, one or more of the disclosed systems and methods provide particular benefits to thin gauge material, such as improving deposition rates, aiding in additive manufacturing, and avoiding burn through, while maintaining good wetting action.

In disclosed examples, a welding-type system includes a welding-type power source to generate output power for a periodic welding process that operates in an arc mode, an open circuit mode or a short circuit mode. A wire-feeder advances an electrode wire toward a workpiece. A controller adjusts the current to below a threshold value during the arc mode to result in the open circuit mode prior to occurrence of a short circuit event based on one or more welding process parameters.

In some examples, the controller determines the occurrence of the short circuit event based on the one or more welding process parameters, and adjusts the current to rise above a second threshold level to adjust a heat generated in the welding wire in response to the occurrence of the short circuit.

In examples, the controller adjusts the current to rise above a second threshold level for a predetermined duration to regulate a heat generated in the welding wire. In some examples, the welding wire advances toward the workpiece as the controller extinguishes the welding arc. In examples, one or more sensors measures one or more welding process parameters, wherein the controller is further configured to receive the one or more welding process parameters from the sensors.

In some examples, the one or more welding process parameters are output parameters of the welding-type power source. In examples, the output parameters comprise a voltage output, a current output, or a power output. In some examples, a temperature sensor to measure the heat of the workpiece. In examples, the controller determines a target amount of heat generated in a workpiece based on the one or more welding process parameters.

In some examples, the controller determines a representative ratio of time that the periodic welding process is in the arc mode to time spent in the short circuit mode corresponding to the target amount of heat generated in the workpiece. In examples, a list of values corresponding to a ratio of time that the periodic welding process is in the arc mode to time spent in the short circuit mode for a given welding process of the one or more welding processes. The controller compares the target amount of heat to the list of values; and determines the representative ratio based on the comparison.

In some examples, the controller measures a time that the periodic welding process is in the arc mode, a time spent in the open circuit mode, and a time spent in the short circuit mode; calculates a ratio of the arc mode time and one of the open circuit mode time or the short circuit mode time based on the measured times; and compare the calculated ratio to the representative ratio; and adjusts a current output in the arc mode based on the comparison.

In examples, the controller is further configured to communicate command signals to the variable speed wire-feeder to control a speed or a direction of motion of the electrode wire to control the ratio of the time spent in the arc mode to the time spent in and one of the open circuit mode or the short circuit mode to stay within a threshold level of the determined representative ratio. In some examples, the controller adjusts a current output for the welding process to extinguish the welding arc during the open circuit mode.

In disclosed examples, a welding-type system includes a welding-type power source configured to generate output power for a periodic welding process that operates in an arc mode, an open circuit mode, or a short-circuit mode; a variable speed wire-feeder; one or more sensors configured to measure one or more welding process parameters; and a controller to receive the one or more welding process parameters from the sensors; monitor the one or more welding process parameters; periodically adjusting a current output to below a first threshold current level during the arc mode to result in the open circuit mode, and then adjusting the current output above a second threshold level during the short circuit mode for a predetermined amount of time; and adjust the current to a third threshold value after the short circuit event to ignite a welding arc in a second arc mode.

In some examples, an interface receives an input corresponding to one or more welding processes characteristics, the controller further configured to calculate a representative ratio based on the input. In examples, the interface is a graphical user interface. In some examples, the one or more welding process parameters includes one or more of a workpiece material, an electrode wire type, an electrode wire gauge, a joint type, a welding process, a welding sequence, or a gas type. In examples, the periodic welding process performs an additive manufacturing operation.

In disclosed examples, a welding-type system includes a welding-type power source configured to generate output power for a periodic welding process that operates in an arc mode, an open circuit mode, or a short-circuit mode; a variable speed wire-feeder; one or more sensors configured to measure one or more welding process parameters; and a controller to receive the one or more welding process parameters from the sensors; monitor the one or more welding process parameters; and periodically adjust a current output below a first threshold current level during the arc mode to result in the open circuit mode, and then adjusting the current output above a second threshold level during the short circuit mode for a predetermined amount of time.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuit and other ancillary circuit associated therewith.

As used herein, the term "pulse welding" includes welding with output power that is generally pulsed, at a controllable frequency, between a greater peak and a lesser background, and pulse welding is performed in an arc state.

As used herein, the term "periodic" and/or "cyclical" welding process and/or output includes welding output that may be characterized as a series of periods and/or cycles, wherein each cycle may be the same, similar or different.

As used herein, the term "wire feeder" includes the motor or mechanism that drives the wire, the mounting for the wire, and controls related thereto, and associated hardware and software.

As used herein, the term "bi-directional wire feeder" includes the motor or mechanism that drives the wire, the mounting for the wire, and controls related thereto, and associated hardware and software, the bi-directional wire feeder being capable of both advancing and reversing the wire. The bi-directional wire feeder can be used during a periodic and/or a cyclical welding process As used herein, the term "controller" or "control circuit" includes digital and/or analog circuit, discrete or integrated circuit, microprocessors, DSPs, FPGAs, etc., and/or software, hardware and firmware, located on one or more boards, used to control all or part of a welding-type system or a device such as a power supply, power source, engine or generator.

As used herein, a "circuit" or "circuit" includes any analog and/or digital components, power and/or control elements, such as a microprocessor, digital signal processor (DSP), software, and the like, discrete and/or integrated components, or portions and/or combinations thereof.

As used herein, the term "energy storage device" is any device that stores energy, such as, for example, a battery, a supercapacitor, etc.

As used herein, the term "memory" includes volatile and non-volatile memory, and can be arrays, databases, lists, etc.

As used herein, the term "torch" or "welding-type tool" can include a hand-held or robotic welding torch, gun, or other device used to create the welding arc.

As used herein, the term "welding mode" or "welding operation" is the type of process or output used, such as CC, CV, pulse, MIG, TIG, spray, short circuit, etc.

As used herein, the term "boost converter" is a converter used in a circuit that boosts a voltage. For example, a boost converter can be a type of step-up converter, such as a DC-to-DC power converter that steps up voltage while stepping down current from its input (e.g., from the energy storage device) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

Figure 1:
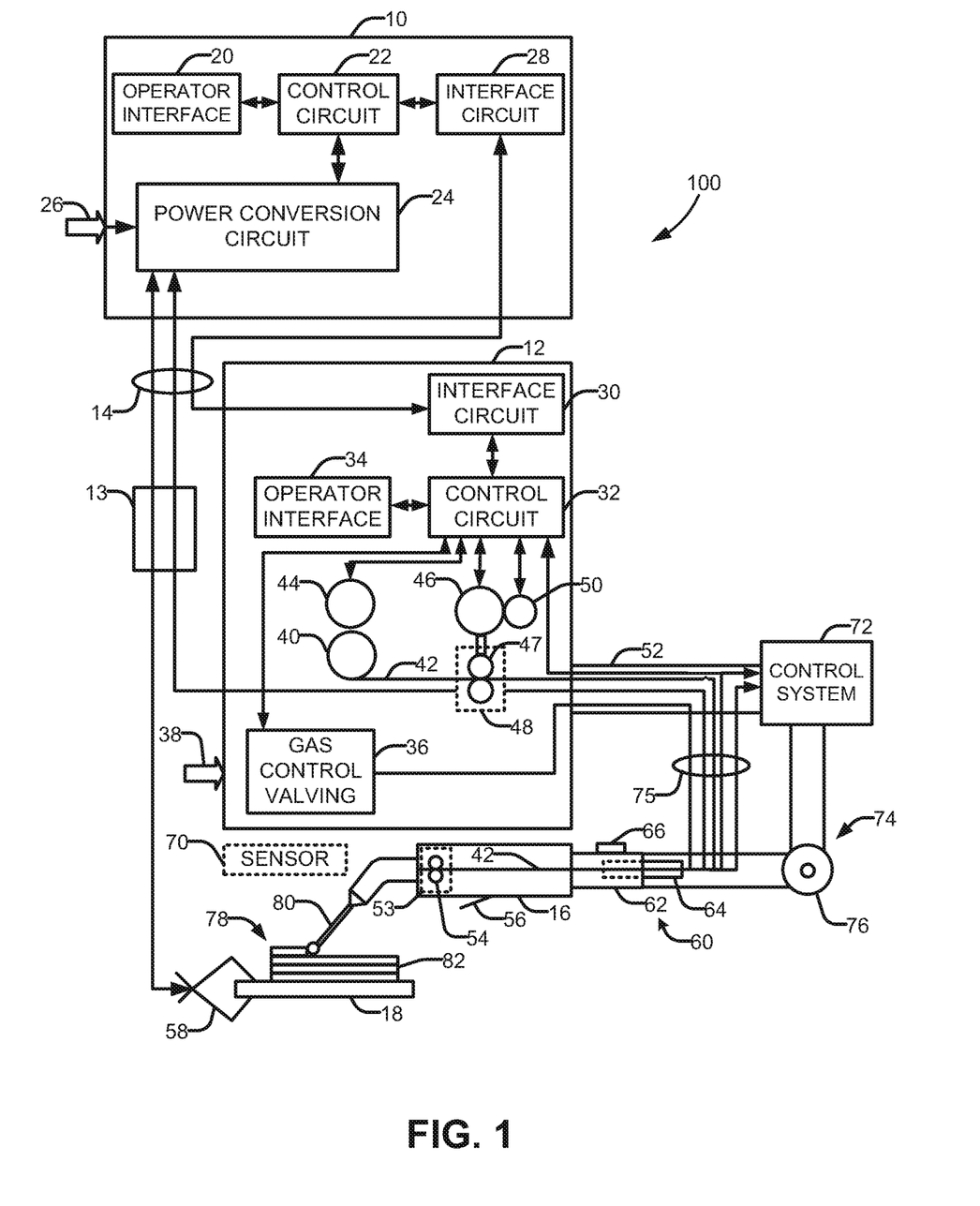
FIG. 1 illustrates a welding-type system employing a controlled short circuit welding process, in accordance with aspects of this disclosure.

FIG. 1 illustrates an example arc welding-type system 100 for performing controlled short circuit (CSC) welding operations. As shown in the arc welding-type system of FIG. 1, a power supply 10 and a wire feeder 12 are coupled via conductors or conduits 14. In the illustrated example, the power supply 10 is separate from the wire feeder 12, such that the wire feeder may be positioned at some distance from the power supply near a welding location. However, in some examples the wire feeder may be integrated with the power supply 10. In such cases, the conduits 14 would be internal to the system. In examples in which the wire feeder 12 is separate from the power supply 10, terminals are typically provided on the power supply and on the wire feeder 12 to allow the conductors or conduits to be coupled to the systems so as to allow for power and gas to be provided to the wire feeder 12 from the power supply 10, and to allow data to be exchanged between the two devices.

The system 100 is configured to provide wire, power and shielding gas to a welding tool or welding torch 16. The tool 16 may be of many different types, and may allow for the feed of a welding wire 42 (e.g., an electrode wire) and gas to a location adjacent to a workpiece, substrate or platform 18. A second conductor is run to the welding workpiece so as to complete an electrical circuit between the power supply and the workpiece. In the context of additive manufacturing, the substrate 18 provides a foundation upon which a part 78 that includes layers 82 is to be formed by application of metal droplets 80. The disclosed controlled short circuit welding system 100 can employ a switch 13 to provide an alternative current path for one or more welding processes.

The welding system 100 is configured for data settings to be selected by the operator and/or a welding sequence, such as via an operator interface 20 provided on the power supply 10. The operator interface 20 will typically be incorporated into a front faceplate of the power supply 10, and may allow for selection of settings such as the weld process, the type of wire to be used, voltage and current settings, and so forth. In particular, the system is configured to allow for welding with various steels, aluminums, or other welding wire that is channeled through the tool 16. Further, the system is configured to employ welding wires with a variety of cross-sectional geometries (e.g., circular, substantially flat, triangular, etc.). These weld settings are communicated to a control circuit 22 within the power supply. The system may be particularly adapted to implement welding regimes configured for certain electrode types.

As disclosed herein, a periodic controlled short circuit welding process implemented in system 100 operates in an arc mode, an open circuit mode or a short circuit mode. Controller 22 can adjust the current output from the power source 10 to a level below a threshold current value during the arc mode to result in the open circuit mode prior to occurrence of a short circuit event between wire 42 and workpiece 78. The change in current serves to regulate the heat generated in response to the electric arc.

Thus, heat regulation can be attained by commanding the current to reduce to below a threshold value, such as to extinguish the arc completely prior to entering the short circuit. Thus, the periodic welding technique repeats the cycle of an arc mode, followed by an open circuit mode, followed by a short circuit mode, thereby reducing heat input from the current.

Additionally, or alternatively, process instructions for the periodic welding process can be provided via a weld sequence program, such as stored on a memory accessible to a processor/control circuit 22 associated with the power supply 10. In such a case, the sequencer can employ stored information (e.g., associated with a desired product configuration and/or process, including historical data), and/or customizable by a user. For instance, information associated with a particular design (e.g., thermal profiles associated with the part 78, material characteristics, system control parameters, etc.) corresponding to the part 78 can be stored in a memory and/or provided via a network interface. Thus, the information can be used to control operation of the system to facilitate formation of the part 78, such as by controlling a power output from the power supply 10, wire feeder motors 48, 54, etc.

The control circuit 22 operates to control generation of welding power output that is supplied to the welding wire 42 for carrying out the desired welding operation. In examples, the control circuit 22 may be adapted to regulate a MIG welding regime that promotes short circuit transfer of molten metal to the part 78, without adding excessive energy to the part 78 or the welding wire 42. In "short circuit" modes, droplets of molten material form on the welding wire 42 under the influence of heating by the welding arc, and these are periodically transferred to the part 78 by contact or short circuits between the welding wire 42 and droplets 80 and the part 78. Note that herein in this disclosure part 78 is sometimes referred to as workpiece, weldment or welding workpiece.

In this manner, the system and/or the control circuit 22 controls the welding of the part 78 by adjusting one or more welding process parameters of the system during the welding process. The welding process parameters may include, but are not limited to, wire feeder speed, wire feeder direction, travel speed, power output, process mode, deposition path, deposition sequence, torch angle, etc.

Additionally, a sensor(s) 70 can measure operational parameters associated with operation of the system (e.g., current, voltage, inductance, phase, impedance, power, inductance, speed, acceleration, orientation, position, etc.). The sensed operational characteristic (e.g., voltage, current, temperature, shape, speed, etc.) can be provided to the control circuit 22 or other controller (e.g., control circuit 32, a controller associated with the control system 72, etc.) to further control the welding process.

Power from the power supply is applied to the wire electrode 42, typically by a welding cable 52. Similarly, shielding gas is fed through the wire feeder and the welding cable 52. During welding operations, the welding wire 42 is advanced through a jacket of the welding cable 52 towards the tool 16. Within the tool 16, a second wire feeder motor 53 comprises rollers 54 may be provided with an associated drive roller, which can be regulated to provide the desired wire feed speed and/or direction.

A control system 72 can be employed to regulate, for example, movement and position of the tool 16 in accordance with the control circuits 22, 32, as well as information from sensor(s) 70. In examples, the control system 72 may be in communication with the power supply 10, the wire feeder 12 and/or the tool 16 via one or more cables 75. Thus, power and/or information can be provided and/or exchanged via cable 75 to control the welding process. In particular, the control system 72 can employ one or more arms 74 having one or more actuators 76 (e.g., servo motors, joints, etc.). In this way, the control system 72 can command fine control of the attached tool 16 in six degrees of freedom during the welding operation, including travel speed, tool location, distance from the part 78, etc. The control system 72 may include one or more sensors to sense welding process parameters, which can be communicated with the control circuits 22, 32 to further facilitate formation of the part 78.

In some examples, the control circuits 22, 32 may provide a signal to the wire feeder 12, the power supply 10, and or the control system 72 to enable the welding process to be started and stopped in accordance with a particular application or welding process. That is, upon initiation of the process, gas flow may begin, wire may advance, and power may be applied to the welding cable 52 and through the contact tip of the tool 16 to the advancing welding wire 42. A workpiece cable and clamp 58 allow for closing an electrical circuit from the power supply through the welding torch, the electrode (wire), and the part 78 for maintaining the welding arc during the operation.

The present arc welding system allows for control of successive voltage and/or current levels and/or pulse durations based on previous current and duration measurements so as to control the promotion, occurrence, duration, and interruption of short circuit events between the welding wire electrode and the advancing weld puddle. In particular, current waveforms can be regulated based on one or more preceding short circuit events, or aspects of the short circuit events, such as its duration.

The control circuit 22 is coupled to power conversion circuit 24. This power conversion circuit 24 is adapted to create the output power, such as pulsed waveforms applied to the welding wire 42 at the tool 16. Various power conversion circuits may be employed, including choppers, boost circuit, buck circuit, inverters, converters, and so forth. The configuration of such circuit may be of types generally known in the art in and of itself. The power conversion circuit 24 is coupled to a source of electrical power as indicated by arrow 26. The power applied to the power conversion circuit 24 may originate in the power grid, although other sources of power may also be used, such as power generated by an engine-driven generator, batteries, fuel cells or other alternative sources. The power supply illustrated in FIG. 1 may also include an interface circuit 28 configured to allow the control circuit 22 to exchange signals with the wire feeder 12.

The wire feeder 12 may include a complimentary interface circuit 30 that is coupled to the interface circuit 28. In some examples, multi-pin interfaces may be provided on both components and a multi-conductor cable run between the interface circuit to allow for such information as wire feed speeds, processes, selected currents, voltages or power levels, and so forth to be set on either the power supply 10, the wire feeder 12, or both.

The wire feeder 12 also may include control circuit 32 coupled to the interface circuit 30. As described below, the control circuit 32 allows for wire feed speeds to be controlled in accordance with operator selections or stored sequence instructions, and permits these settings to be fed back to the power supply via the interface circuit. The control circuit 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuit 32 may also be coupled to gas control valving 36 that regulates the flow of shielding gas to the torch. In general, such gas is provided at the time of welding, and may be turned on immediately preceding the weld and for a short time following the weld. The gas applied to the gas control valving 36 may be provided in the form of pressurized bottles, as represented by reference numeral 38.

The wire feeder 12 includes components for feeding wire to the welding tool 16 and thereby to the welding application, under the control of control circuit 32. For example, one or more spools of welding wire 40 are housed in the wire feeder. Welding wire 42 is unspooled from the spools and is progressively fed to the tool 16. The spool may be associated with a clutch 44 that disengages the spool when wire is to be fed to the tool. The clutch 44 may also be regulated to maintain a minimum friction level to avoid free spinning of the spool 40. The first wire feeder motor 46 may be provided within a housing 48 that engages with wire feed rollers 47 to push wire from the wire feeder 12 towards the tool 16.

In the example of FIG. 1, a moveable buffer 60 can include a first portion 62 and a second portion 64, where at least one of the first and second portions are configured to move relative the other portion in response to a change in the amount of welding wire 42 between a first wire feeder motor 46 and a second wire feeder motor 53. A sensor 66 (e.g., one or more sensors) is configured to sense relative movement or displacement between the first and second portions and provide sensor data to control circuit (e.g., control circuit 22, 32) to adjust a speed and/or direction of the welding wire 42 in response.

In practice, at least one of the rollers 47 is mechanically coupled to the motor and is rotated by the motor to drive the wire from the wire feeder, while the mating roller is biased towards the wire to maintain good contact between the two rollers and the wire. Some systems may include multiple rollers of this type. A tachometer 50 or other sensor may be provided for detecting the speed of the first wire feeder motor 46, the rollers 47, or any other associated component so as to provide an indication of the actual wire feed speed. Signals from the tachometer are fed back to the control circuit 32, such as for continued or periodic monitoring, calibration, etc. In some examples, the system includes a wire spool motor for rotating the wire-feeding device, which can be similarly adjusted to increase or decrease the amount of wire between wire feeder motors.

In some examples, the wire feeder 12 can be configured to reverse the direction of the welding wire 42 (i.e. a bi-directional wire feeder). Moreover, although described as operating with two wire feeders and/or wire feeder motors (e.g., wire feeder motors 46 and 53), the system can operate with a single wire feeding unit to advance and/or reverse wire during welding operations (e.g., formation of a part 78). Additionally, or alternatively, in some examples, one wire feeder may be configured to advance the wire 42 while another wire feeder is configured to reverse the direction of the wire. In this example, one or more control circuit (e.g., control circuits 22, 32) coordinates operation of the two wire feeders to implement a controlled short circuit welding process in a welding system, as disclosed herein.

Other system arrangements and input schemes may also be implemented. For example, the welding wire may be fed from a bulk storage container (e.g., a drum) or from one or more spools outside of the wire feeder. Similarly, the wire may be fed from a "spool gun," in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Although described with respect to an arc welding-type system, the disclosed system may be implemented in conjunction with a variety of technologies to conduct various types of welding processes.

Thus, as described with respect to FIG. 1, the welding-type system 100 can include a welding-type power source 10 configured to generate output power for an arc welding process, for example, to power one or more of the wire feeder 12, the robotic system 74, perform arc welding via tool 16, etc. The wire feeder 12 may be a bi-directional wire feeder configured to advance or retract the wire 42 to or from the workpiece 18. Sensors 70 measure one or more welding process parameters, and provide such measurements to a controller (e.g., control circuit 22, control circuit 32, control system 72, etc.), which commands operation of the, for instance, in response to one or more welding process parameters exceeding one or more threshold values corresponding to a short clearance event during a welding/additive manufacturing operation.

Figure 2:
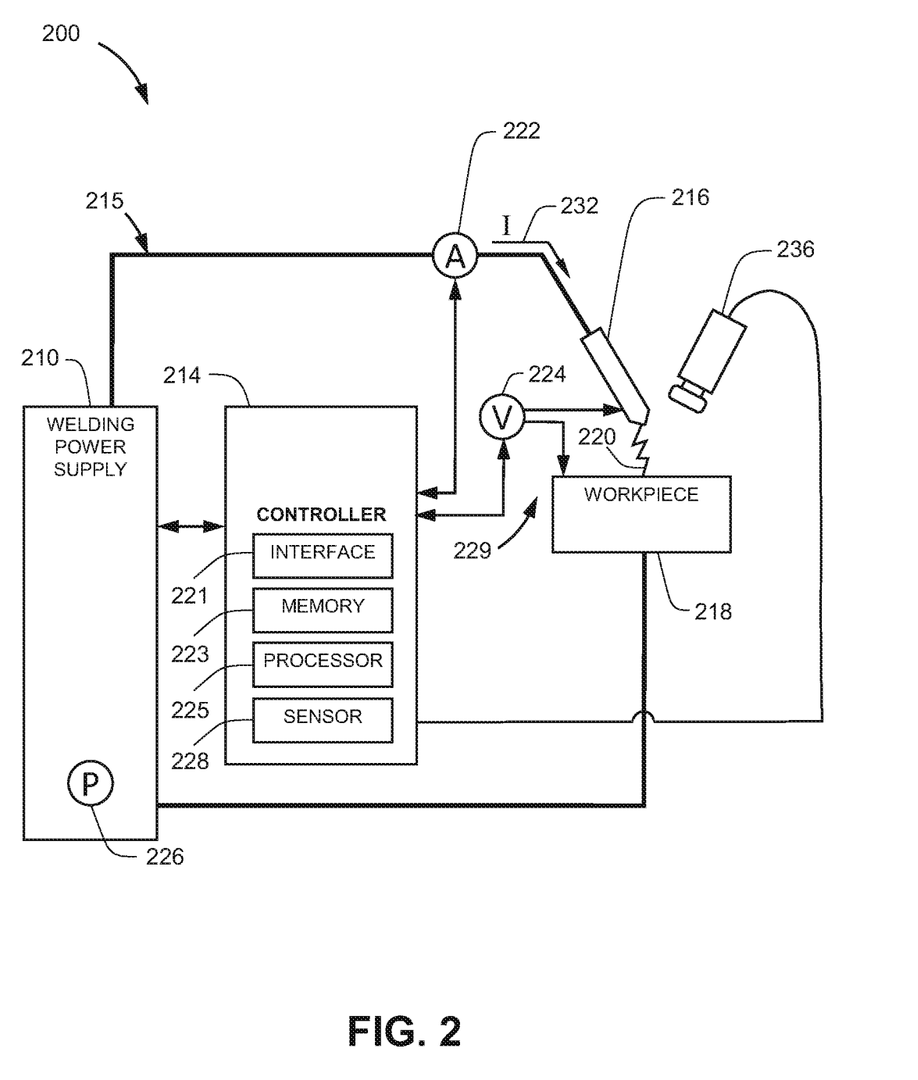
FIG. 2 is a block diagram of an example welding-type system in accordance with aspects of this disclosure.

FIG. 2 depicts a block diagram of an example welding-type power system 200 in accordance with aspects of this disclosure. The system 200 comprises a welding power supply 210, a controller 214, a welding torch 216 and a workpiece and/or substrate 218. The welding arc 220 forms between the welding torch 216 and the workpiece 218. In addition, the system includes a current sensor 222, a voltage sensor 224, a power sensor 226, a heat sensor 236, and/or additional sensor 228 (e.g., an impedance sensor, etc.). Provision of power is directed through current path 215, controlled by the controller 214 to direct current flow through the welding wire to the workpiece 218.

The controller 214 is connected to one or more components via an interface 221, including sensors 222, 224, 226, 228, and 236, and/or tool 216, and can receive data corresponding to the one or more welding process parameters from one or more of these components.

As disclosed herein, the controller 214 adjusts the current to below a first threshold current level during the arc mode to result in the open circuit mode. In this example, the current may go to a low or zero value, thereby extinguishing the arc as the wire continues to advance. In some examples, the controller 214 can reduce the current in response to a comparison of the monitored welding process parameters to a list of threshold current values (e.g., stored in memory 223 and/or provided via interface 221 to a remote source or operator input). The values can include wire feed speed, voltage, current, a rate of change of one or more such parameters, etc.

Once a short circuit has occurred (as determined by the controller 214, see below), the controller 214 adjusts the current output above a second threshold level during the short circuit mode to encourage joule heating in the wire. The second threshold current level can be applied based on a variety of control parameters, such as for a predetermined amount of time, until a predetermined change in one or more welding parameters is reached, for instance. Furthermore, the controller 214 can adjust the current to a third threshold value after the short circuit event (e.g., after clearance of the short circuit) to ignite a welding arc in a second arc mode of the welding cycle.

In some examples, the controller 214 compares the received data to a plurality of threshold values associating welding process parameters to short clearance events, which can be stored in a memory 223 and/or accessed remotely via interface 221. The controller 214 then determines an anticipated short circuit event or an occurrence of a short circuit event based on the one or more welding process parameters, for instance by analyzing the parameters via processor 225.

As shown in FIG. 2, current sensor 222 measures the value of the current 232 that flows to the welding torch 216. The voltage sensor 224 measures the voltage between the welding torch 216 and the workpiece 218. Sensor 228 can be implemented as an impedance sensor to determine impedance of the load 229. The welding power supply 210 includes a power sensor 226, which measures the power being supplied by the welding power supply 226 to the system 200.

These welding process parameters are only a few examples of the many welding process parameters, which can be either measured or determined by the sensors or the various components of the system 200. In the welding-type system 200, one or more threshold values may corresponding to an anticipated short circuit event. The threshold value may correspond to a detected short circuit event and the one or more welding process parameters may include a voltage or a rate of change of the voltage and/or arc current. The threshold value may correspond, additionally or alternatively, to a detected short circuit event. The determination of an anticipated or occurring short circuit can instruct the controller 214 to adjust the current output 232 to regulate the heat generated in the wire, such as during a transition from the open circuit mode to the short circuit mode.

In some examples, the controller 214 can determine a short clearance event based on the one or more welding process parameters. The welding process parameters could, for example, include the exemplary current 232 measured by the current sensor 222, the voltage measured by the voltage sensor 224, the impedance of the load 229 measured or determined by impedance sensor 228 or the power supplied by the welding power supply measured by power sensor 226. A rapid change in one or more of the welding process parameters could correspond to a short clearance event, thereby indicating a transition from the short circuit mode to the arc mode, as shown in FIGS. 4-6B.

Additionally or alternatively, the controller 214 can determine a target amount of heat generated in a workpiece 218 based on the one or more welding process parameters, such as current, rate of deposition, wire feed speed, etc. Further, the controller can estimate the heat value based on the applied current multiplied by a numerical constant.

In some examples, the controller 214 can determine a representative ratio of time that the periodic welding process is in the arc mode to time spent in the short circuit mode. Such a ratio corresponds to a target amount of heat generated in the workpiece. This representative ratio can be provided from a list of values that correspond to a ratio of time that the periodic welding process is in the arc mode to time spent in the short circuit mode for a given welding process of the one or more welding processes. For example, the controller 214 can compare the target amount of heat to the list of values, and determine the representative ratio based on the comparison.

Once determined, the controller can measure a time that the periodic welding process is in the arc mode, a time spent in the open circuit mode, and a time spent in the short circuit mode. The controller 214 then calculates a ratio of the arc mode time and one of the open circuit mode time or the short circuit mode based on the measured times. In response to a comparison of the calculated ratio to the representative ratio, the controller 214 then adjusts a current output in the arc mode based on the comparison to regulate the heat generated therefrom.

It is advantageous to control heat input during welding processes, which provides greater control of metal deposition. In some examples for additive manufacturing processes, it is advantageous to use heat regulation techniques to decrease and/or minimize the amount of heat generated during welding to provide greater control over various welding parameters, such as travel speed, deposition rate, and additive structure width, among others. Methods and techniques for controlling heat input during short-circuiting type welding processes are described further below.

Figure 3A:
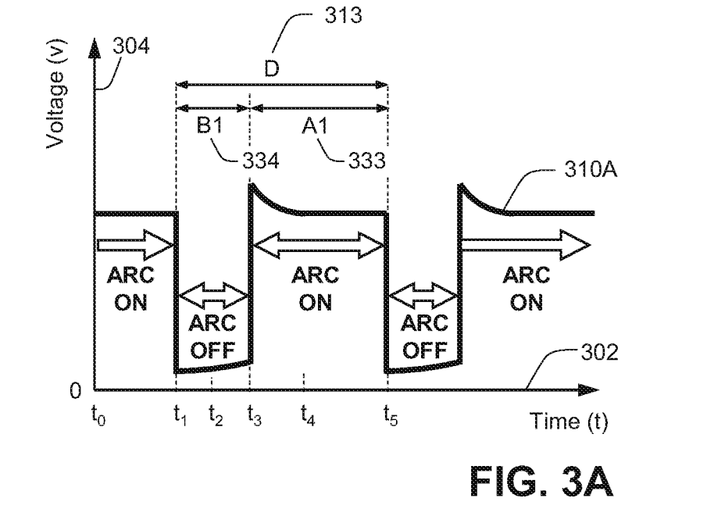
FIGS. 3A and 3B illustrate voltage characteristic profiles, in accordance with aspects of this disclosure.
Figure 3B:
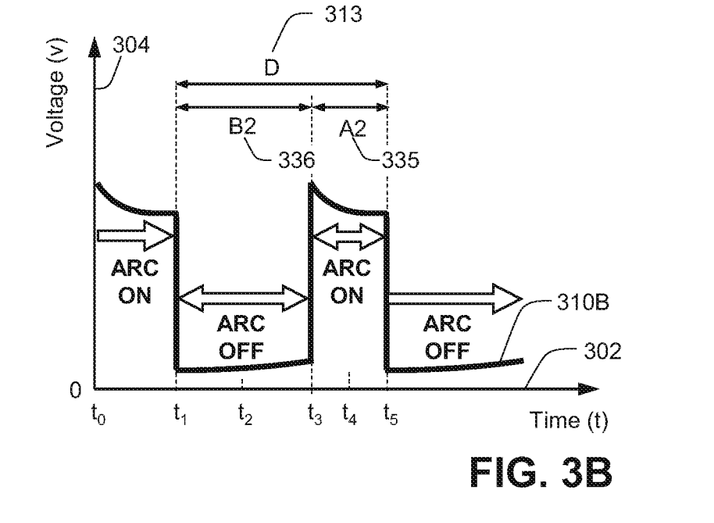

FIGS. 3A and 3B illustrate voltage characteristic profiles corresponding to regulating heat generated through the control of the ratio of time spent in the arc to the time in the short, in accordance with aspects of this disclosure. The welding process parameters are measured and/or determined via an output of the power source.

The controller monitors the welding process parameters and determines a representative ratio of time that the periodic welding process is in the arc mode to time spent in the short-circuit mode based on the welding process parameters. The representative ratio corresponds to a target amount of heat generated in the workpiece. The representative ratio can be calculated based on historical data (e.g., from previous welding operations and/or from a library of welding parameter values) corresponding to welding parameters (e.g., current, power, voltage, etc.) associated with a heat value. The controller controls the welding parameters, such as current, power, voltage, as well as wire feed speed and/or the direction, to control the ratio of time spent in the arc mode to time spent in the short-circuit mode to stay within a threshold level of the representative ratio.

Referring to FIGS. 3A and 3B, the horizontal axis 302 indicates time and the vertical axis 304 indicates voltage. The parameter D, indicated by reference numeral 313, indicates the duration of one cycle. Note that the parameter D is the same in both FIGS. 3A and 3B. Also, note that, although changes in voltage are used for illustration, other welding parameters may be used to determine the desired ratio, including current, temperature, power, for example.

The parameter A1, indicated by reference numeral 333 in FIG. 3A and the parameter A2 indicated by reference numeral 335 in FIG. 3B, indicate the duration of time that the system is in the arc mode. Note that the parameters A1 and A2, which represent the time the arc is present and the flow of current is generating heat, are not the same in FIGS. 3A and 3B.

The parameter B1, indicated by reference numeral 334 in FIG. 3A and the parameter B2 indicated by reference numeral 336 in FIG. 3B, indicate the duration of time that the system is in the short circuit mode. Note that the parameters B1 and B2 are not the same in FIGS. 3A and 3B.

The voltage characteristic profiles 310A and 310B both show the variations of voltage with respect to time. However, note that the voltage characteristic profiles 310A and 310B are not the same. FIGS. 3A and 3B are illustrations of the voltage characteristic profiles 310A and 310B and illustrate the method of controlling the amount of heat generated through the control of the ratio of time spent generating an arc (arc mode) to the time without an arc (open circuit and/or short circuit mode), in accordance with aspects of this disclosure. Parameters A1 and A2 are associated with the arc mode and parameters B1 and B2 are associated with the open circuit and/or short circuit modes.

More heat is generated as the ratio of time spent in the arc mode to the time spent in the open circuit and/or short circuit modes increases. For example, the parameter A1/B1 in FIG. 3A is larger than the parameter A2/B2 in FIG. 3B, as a result more heat is generated in the case of FIG. 3A than in the case of FIG. 3B. The controller may control or adjust the ratio A/B, denoting the ratio of the arc mode time (A) to the time without an arc (B), the controller can control the amount of heat generated in the system. The heat reduction method depicted in FIGS. 3A and 3B can also regulate heat input by adjusting the time and/or speed with which the wire advances and/or retracts with respect to the workpiece.

Figure 4:
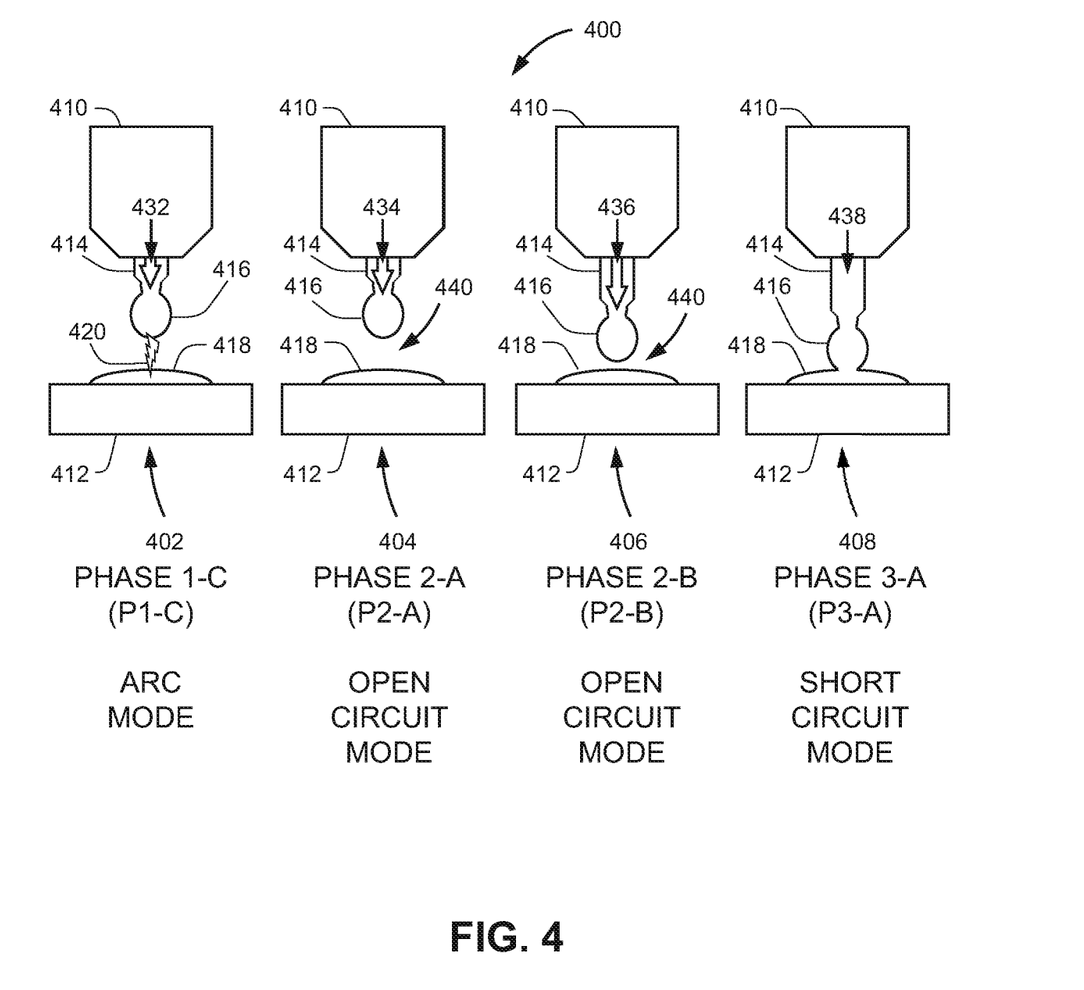
FIG. 4 illustrates an example welding operation, in accordance with aspects of this disclosure.

FIGS. 4-6B illustrate phases of an example controlled short circuit welding process. For instance, FIG. 4 illustrates a welding process with the electrode wire moving toward the workpiece, and then stopping.

As shown in FIG. 4, Phase 1 (P1) corresponds to the arc mode portion of the process during which the arc is present. One portion of this Phase 1 (P1) is the Phase 1-C (P1-C), indicated by reference numeral 402. During Phase 1-C (P1-C), the wire extending from the tip of the welding torch 410 approaches the workpiece 412. The wire 414 is extending from the tip of the welding torch 410 and moving toward the workpiece 412, as indicated by the arrow 432. There is a molten droplet 416 at the tip of the wire 414, not yet in contact with molten puddle 418 that is on the workpiece 412. There is active arc 420 between the tip of the wire 414 and the molten puddle 418.

Phase 2 (P2) corresponds to an open circuit mode during which the arc is inactive. One portion of this Phase 2 (P2) is Phase 2-A (P2-A), indicated by reference numeral 404. During Phase 2-A (P2-A), the wire of the welding torch 410 advances toward the workpiece 412 as indicated by the arrow 434. There is a molten droplet 416 at the tip of the wire 414, which is not yet in contact with the molten puddle 418. As indicated by the arrow 440, there is no active arc 420 present between the tip of the wire 414 and the molten puddle 418.

Reference numeral 406 indicates that in Phase 2-B (P2-B), similar to Phase 2-A (P2-A), an open circuit mode exists with no active arc. The difference between Phase 2-B (P2-B) and Phase 2-A (P2-A) is that during the Phase 2-B (P2-B), as compared to Phase 2-A (P2-A), the tip of the wire 414 has advanced (as indicated by the arrow 436) and is now closer to the puddle 418, but still not making contact. Because during the Phase 2-A (P2-A) and Phase 2-B (P2-B) there is no current flowing, there is no arc (as indicated by arrow 440), and thus the molten droplet 416 and the molten puddle 418 begin to gradually cool, however both the molten droplet 416 and the molten puddle 418 are still in molten state.

Phase 3 (P3) corresponds to a short circuit mode of the process. During portion Phase 3-A (P3-A) indicated by the reference numeral 408 the wire 414 is has made contact with the molten puddle 418, as the wire 414 is no longer moving. The wire 414 has reached the end of this downward travel path and the motion of the wire 414 has stopped. There is a molten droplet 416 at the tip of the wire 414 and the tip of the wire 414 is now in contact with the molten puddle 418. A short-circuit has occurred, as the process transitions from the open circuit mode to the short circuit mode. The amount of time the welding process spends in the open circuit mode can be based on one or more welding process parameters, including amount of material melted during the arc phase, the droplet size, wire speed, motion of the weld puddle, among others.

Figure 5:
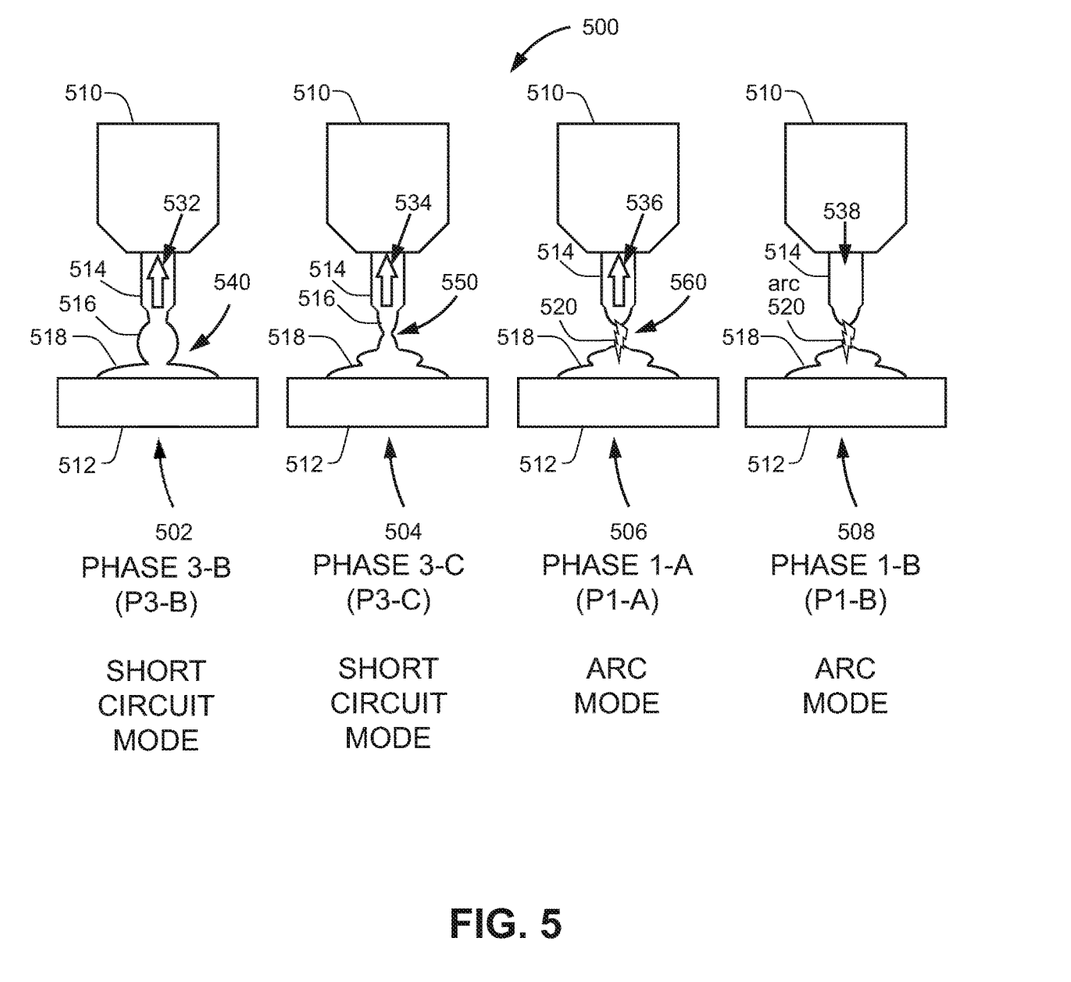
FIG. 5 illustrates another example welding operation, in accordance with aspects of this disclosure.

FIG. 5 illustrates a continuation of the welding process of FIG. 4, where phases of the example controlled short circuiting welding process retract the wire from the workpiece 418, and then stop. As disclosed with respect to FIG. 4, Phase 3 (P3) corresponds to the short circuit mode of the process during which the arc is inactive. During Phase 3-B (P3-B) indicated by reference numeral 502, the wire 514 extends from the welding torch 510 in contact with the workpiece 512 resulting in a short circuit event, indicated by 540. The wire 514 begins to retract, as indicated by arrow 532. The molten droplet 516 at the tip of the wire 514 is still in contact with the molten puddle 518. During Phase 3, the current level can be increased to a level sufficient for Joule heating in the wire, as described in greater detail with respect to FIG. 6B.

During Phase 3-C (P3-C) indicated by reference numeral 504, the wire 514 is now moving away from the workpiece 512 as indicated by arrow 534. There is a molten droplet 516 at the tip of the wire 514 and, as indicated by the arrow 540, the tip of the wire 514 is still in contact with the molten puddle 518 that is on the workpiece 512. However, note that at this Phase 3-C (P3-C) the molten droplet 516 has been somewhat stretched due to the retraction of wire 514. However, as indicated by the arrow 550 the short-circuit contact between the droplet 516 at the tip of the wire 514 and the puddle 518 is about to break.

As shown in FIG. 5, due to the periodic nature of the presently disclosed welding process, Phase 1 (P1) corresponds to the arc mode portion of the process during which the arc is active, and follows the clearance of a short circuit (e.g., as shown in Phase 3C). One portion of this Phase 1 (P1) of the process is the Phase 1-A (P1-A) indicated by reference numeral 506 illustrates the wire 514 retracting from the workpiece 512, as indicated by arrow 536. As indicated by the arrow 560, contact between the wire 514 and workpiece 512 has broken and the arc 520 has restarted. At Phase 1-A (P1-A) an active arc 520 is generated between the tip of the wire 514 and the molten puddle 518. At Phase 1-B (P1-B), indicated by reference numeral 508, the wire 514 has stopped retracting and, as indicted by the arrow 538, has now stopped moving and will proceed to the P1-A as provided in FIG. 4.

Figure 6A:
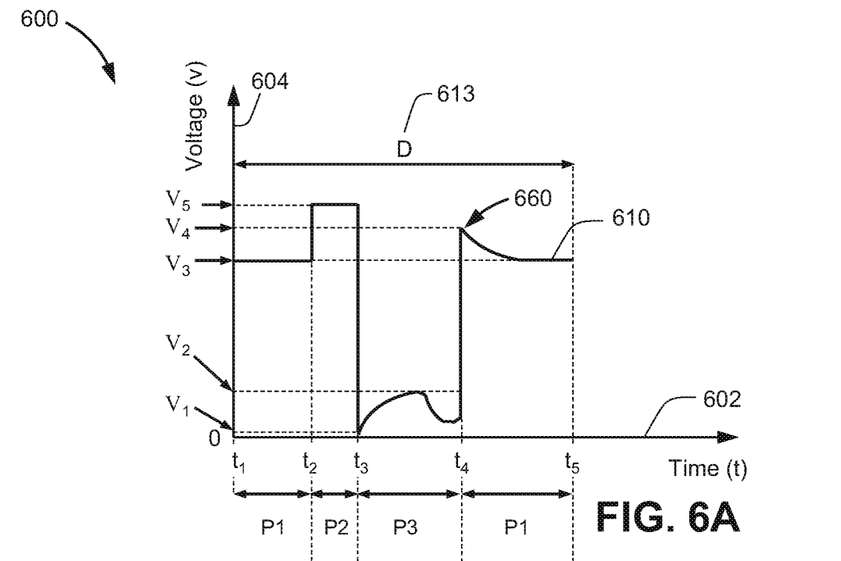
FIGS. 6A and 6B illustrate voltage and current characteristic profiles of a short circuiting welding process, respectively, in accordance with aspects of this disclosure.
Figure 6B:
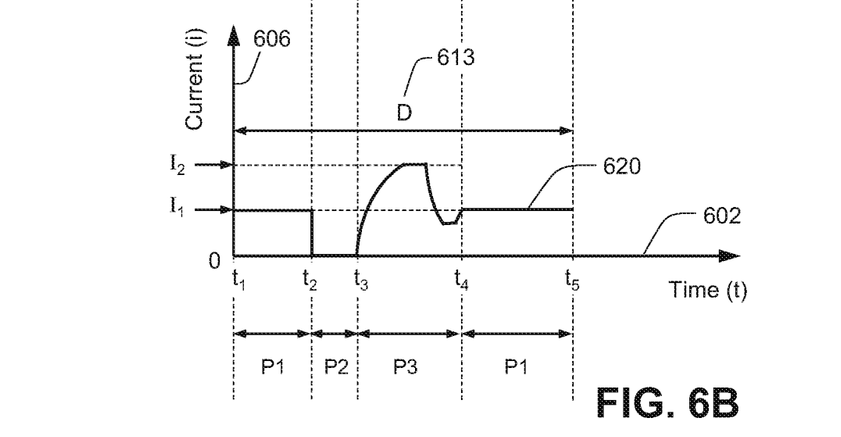

FIGS. 6A and 6B illustrate voltage and current characteristic profiles of an example controlled short circuiting welding process, respectively, in accordance with aspects of this disclosure. Horizontal axes 602 in both FIGS. 6A and 6B indicate time. Vertical axis 604 in FIG. 6A indicates voltage, and vertical axis 606 in FIG. 6B indicates current. Voltage characteristic profile 610 indicates the variations in voltage with respect to time, whereas current characteristic profile 620 indicates the variations in current with respect to time. For example, the voltage 610 represents the voltage between the wire 414 and the workpiece 412 in FIG. 4 and the voltage between the wire 514 and the workpiece 512 in FIG. 5. The current 620 represents current flowing from the wire 414 to the workpiece 412 in FIG. 4 and the current flowing from wire 514 to the workpiece 512 in FIG. 5.

Phases P1, P2 and P3, indicated on both FIGS. 6A and 6B, correspond to Phases P1, P2 and P3 of FIGS. 4 and 5. As indicated in FIGS. 6A and 6B, the duration of Phase 1 (P1) is from $t_1$ to $t_2$ plus the duration from $t_4$ to $t_5$. The duration of Phase 2 (P2) is from $t_2$ to $t_3$. The duration of Phase 3 (P3) is from $t_3$ to $t_4$. In other words, the duration of Phase 1 (P1) is the period from $t_1$ to $t_2$ added to the period from $t_4$ to $t_5$. The voltage characteristic profile 610 and the current characteristic profile 620 are both cyclical functions that repeat with the progression of the welding process. Thus, FIGS. 6A and 6B are a representative cycle in a series of repeating cycles. The duration of one cycle is indicated in both FIGS. 6A and 6B with the parameter D and is indicated by the reference numeral 613.

Referring to FIG. 6B, during Phase 2 (P2), from time $t_2$ to time $t_3$, the current approaches or may reach zero. In other words, the commanded current level is a below a threshold level, below which no arc is present between the wire and the workpiece. This low current level corresponds to an open circuit condition during the open circuit mode as depicted in FIG. 4 indicated by reference numerals 404 and 406, the absence of an arc indicated by the arrow 440 in 404 and 406.

During the time period $t_1$ to $t_2$, current is at the current value $I_1$ and the voltage is at the voltage value $V_3$. At time $t_2$, the current goes to zero and as a result the arc is extinguished and the voltage increases to an open circuit voltage value $V_5$. After the wire makes contact with the workpiece, the current is commanded to increase from zero to the current value $I_2$ during the short-circuit Phase 3 (P3) from $t_3$ to $t_4$. The increase in current corresponds to resistive Joule heating of the wire, which facilitates deposition and reduces splatter. The current may then drop below $I_1$, before returning to $I_1$ before or at time $t_4$.

During this same period between $t_3$ to $t_4$, the voltage responds to the increase in current, increasing from the voltage value $V_1$ to the voltage value $V_2$ or higher. The value of the voltage $V_1$ approaches zero, whereas the value of the voltage $V_2$ may be slightly greater than voltage $V_1$. During the period between $t_3$ to $t_4$, a short circuit occurs between the wire 414 and the workpiece 412 in FIG. 4, and similarly between the wire 514 and workpiece 512 in FIG. 5.

The voltage during the period between $t_3$ to time $t_4$ may not reach zero even though there is a short circuit as there is still a resistance value associated with the molten wire (414 and 514) connected to the molten puddle (418 and 518). As this wire stretches, due to the upward motion of the wire (414 and 514), and as the wire thins, the resistance increases, resulting in a voltage increase from the value of $V_1$ to the value $V_2$. At time $t_4$, the short circuit clears and contact between the wire and the puddle is broken (see 504 and 506 in FIG. 5). As a result, the system progresses from short circuit mode 504 to arc mode 506, as depicted in FIG. 5. When the contact breaks at time $t_4$, the voltage increases rapidly from $V_2$ to $V_4$ as depicted in FIG. 6A. As a result of this rapid increase, a temporary voltage spike may occur, as indicated by the arrow 660 in FIG. 6A. However, following the voltage spike 660, which may increase the voltage to $V_4$, the voltage stabilizes at $V_3$. During the periods between time $t_3$ and time $t_5$, the current decreases from the current value $I_2$ to the current value $I_1$. The cycle then repeats itself through duration D indicated by reference numeral 613.

FIGS. 6A and 6B show representations of example waveforms implemented in accordance with the present disclosure. However, the various phases described with respect to the representative examples can include one or more intermediate phases and/or additional phases, such as at transition points. Additionally or alternatively, one or more of the welding process parameters can be adjusted at any point during one or more phases to generate a desired result. For example, although illustrated in FIG. 6B as maintaining a constant current $I_1$ in the arc mode (P1), the current can be adjusted as needed, such as with intermediate phases of varying target current values, and/or to facilitate transition between phases.

Additionally or alternatively, the welding process parameters disclosed herein can be controlled to maintain a consistent droplet size during the welding process. For example, the wire feed speed can be approximated in order to estimate heat in the wire (e.g. based on the current during the arc and/or open circuit modes). Based on the wire feed speed and the current, the controller can infer the amount of metal being melted based on current provided per second (Amps/sec). If the estimate determines that the heat value of the wire coming out of a short circuit event is below a threshold level, the controller may increase the amount of current provided.

This estimate is associated with the amount of Joule heating occurring during the short circuit mode. Thus, changes to current can be made to change or maintain wire droplet size during the welding process.

Figure 7A:
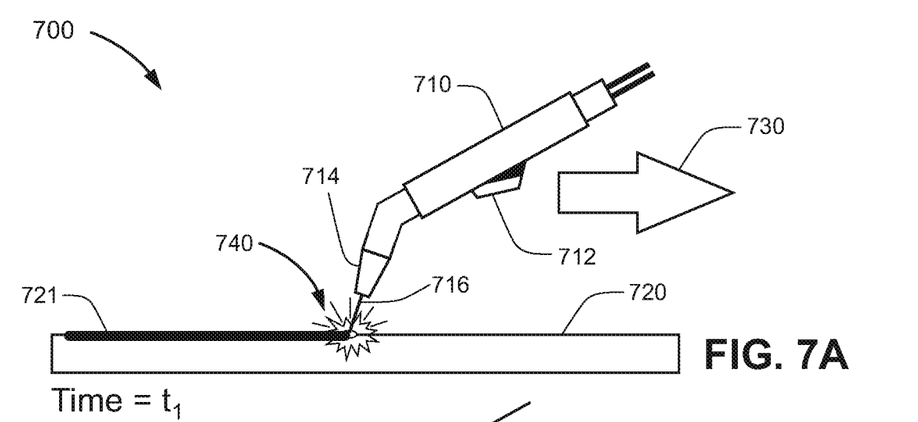
FIGS. 7A, 7B and 7C illustrate yet another example welding operation, in accordance with aspects of this disclosure.
Figure 7B:
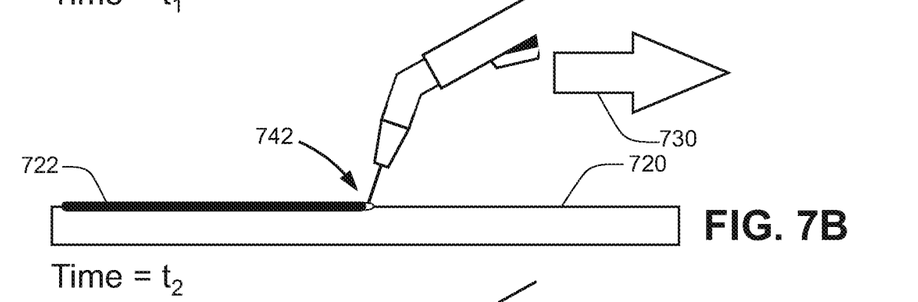
Figure 7C:
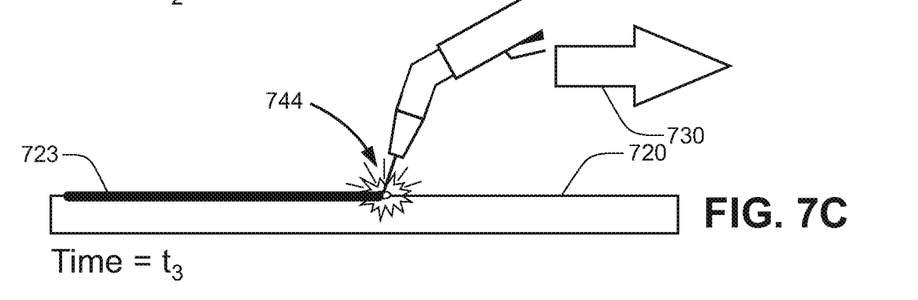

FIGS. 7A, 7B and 7C illustrate an example heat reduction method 700 implemented by periodically stopping a welding process while continuing to move the weld torch 710, in accordance with aspects of this disclosure. An operator (e.g., a welder, robotic system, etc.; not shown) may move welding torch 710 along workpiece 720 in a direction indicated by arrows 730. The welding torch 710 may have a trigger 712 and a welding torch tip 714. A welding wire 716 may advance from the welding torch tip 714 toward a workpiece 720 to form a weld 721. As the welding torch 710 moves along the workpiece 720, the weld 721 may progressively increase in size, as illustrated in FIGS. 7A-7C. Thus, the weld 721 at time $t_1$ increases to weld 722 at time $t_2$, and to weld 723 at time $t_3$.

However, heat produced throughout the welding process from time $t_1$ to time $t_3$, may be reduced through periodic and/or non-periodic stopping of one or more welding process parameters, while the weld torch 710 continues to move along the workpiece 720 in the direction indicated by the arrow 730. For example, at time $t_1$ the arc may be on, as indicated by the arrow 740, generating heat in the wire 716 and the workpiece 720. At time $t_2$ one or more welding process parameters may be adjusted, such that the arc may be turned off (e.g., extinguished), as indicated by the arrow 742. While no arc is present, heat is not generated and the system cools. Thus, the overall amount of heat generated during the period of time $t_1$ to time $t_3$ is reduced.

At time $t_3$, one or more welding process parameters may again be adjusted, such that the arc is again turned on and heat is once more generated. In some examples, although the arc is turned off periodically, the amount of time that the arc is turned off is not long enough for the molten tip of the wire 716 and the molten puddle on the workpiece 720 to lose their molten state and solidify. In other examples, the amount of time that the arc is turned off is calculated to allow the wire 716 and/or the puddle to solidify, depending on the desired effect. In this manner, it is possible for the welding process to continue even during the short periods of time that the arc is turned off as for example indicated by 742 at time $t_2$. This process 700 of periodically turning on and turning off the arc, as indicated in FIGS. 7A, 7B and 7C, may be controlled by a welder, and/or a controller such as indicated for example by the controller 214 in FIG. 2

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system, comprising:
   a welding-type power source configured to generate output power for a periodic welding process that operates in an arc mode, an open circuit mode and a short circuit mode;
   a wire-feeder to advance an electrode wire toward a workpiece; and
   a controller configured to:
     adjust a current to below a threshold value during the arc mode to result in the open circuit mode immediately following the arc mode and prior to occurrence of a short circuit event based on one or more welding process parameters;
     increase the current to a second threshold value during the short circuit mode to encourage joule heating in the electrode wire;
     determine a first ratio of time that the periodic welding process is in the arc mode to time spent in the short circuit mode corresponding to a first amount of heat generated in the workpiece;
     determine a second ratio of time that the periodic welding process is in the arc mode to time spent in the short circuit mode corresponding to a second amount of heat generated in the workpiece; and
     adjust the amount of time that the periodic welding process is in the arc mode or the short circuit mode to achieve the first amount of heat.

2. The welding-type system of claim 1, wherein the controller is further configured to:
   determine the occurrence of the short circuit event based on the one or more welding process parameters; and
   adjust the current to rise above a second threshold level to adjust a heat generated in the welding wire in response to the occurrence of the short circuit.

3. The welding-type system of claim 1, wherein the controller is further configured to adjust the current to rise above a second threshold level for a predetermined duration to regulate a heat generated in the welding wire.

4. The welding-type system of claim 1, wherein the welding wire advances toward the workpiece as the controller extinguishes the welding arc.

5. The welding-type system of claim 1, further comprising one or more sensors configured to measure one or more welding process parameters, wherein the controller is further configured to receive the one or more welding process parameters from the sensors.

6. The welding-type system of claim 1, the one or more welding process parameters are output parameters of the welding-type power source.

7. The welding-type system of claim 6, wherein the output parameters comprise a voltage output, a current output, or a power output.

8. The welding-type system of claim 1, further comprising a temperature sensor to measure the heat of the workpiece.

9. The welding-type system of claim 1, wherein the controller is further configured to determine the first amount of heat generated in a workpiece based on the one or more welding process parameters.

10. The welding system of claim 9, further comprising a list of values corresponding to a ratio of time that the periodic welding process is in the arc mode to time spent in the short circuit mode for a given welding process of the one or more welding processes, the controller further configured to:
compare the first amount of heat to the list of values; and
determine the second ratio based on the comparison.

11. The welding system of claim 10, the controller further configured to:
measure a time that the periodic welding process is in the arc mode, a time spent in the open circuit mode, and a time spent in the short circuit mode;
calculate a ratio of the arc mode time and one of the open circuit mode time or the short circuit mode based on the measured times;
compare the calculated ratio to the first ratio; and
adjust a current output in the arc mode based on the comparison.

12. The welding system of claim 11, wherein the controller is further configured to communicate command signals to the variable speed wire-feeder to control a speed or a direction of motion of the electrode wire to control the ratio of the time spent in the arc mode to the time spent in and one of the open circuit mode or the short circuit mode to stay within a threshold level of the determined first ratio.

13. The welding-type system of claim 1, wherein the controller adjusts a current output for the welding process to extinguish the welding arc during the open circuit mode.

14. The welding-type system of claim 1, wherein the controller is further configured to decrease the current below the first threshold value before returning to the arc phase.

15. A welding-type system, comprising:
a welding-type power source configured to generate output power for a periodic welding process that operates in an arc mode, an open circuit mode, or a short-circuit mode;
a variable speed wire-feeder;
one or more sensors configured to measure one or more welding process parameters; and
a controller configured to:
receive the one or more welding process parameters from the sensors;
monitor the one or more welding process parameters;
adjust a current output to below a first threshold current level during the arc mode to result in the open circuit mode immediately following the arc mode;
adjust the current output to increase above a second threshold level during the short circuit mode following the open circuit mode for a predetermined amount of time to encourage joule heating in an electrode wire;
determine a first ratio of time that the periodic welding process is in the arc mode to time spent in the short circuit mode corresponding to a first amount of heat generated in the workpiece;
determine a second ratio of time that the periodic welding process is in the arc mode to time spent in the short circuit mode corresponding to a second amount of heat generated in the workpiece; and
adjust the amount of time that the periodic welding process is in the arc mode or the short circuit mode to achieve the first amount of heat.

16. The welding system of claim 15, further comprising an interface to receive an input corresponding to one or more welding processes characteristics, the controller further configured to calculate a representative ratio based on the input.

17. The welding system of claim 16, wherein the interface is a graphical user interface.

18. The welding system of claim 15, wherein the one or more welding process parameters comprise one or more of a workpiece material, an electrode wire type, an electrode wire gauge, a joint type, a welding process, a welding sequence, or a gas type.

19. The welding system of claim 15, wherein the periodic welding process is configured to perform an additive manufacturing operation.

* * * * *